(12) United States Patent
Claeyssen et al.

(10) Patent No.: US 11,501,903 B2
(45) Date of Patent: Nov. 15, 2022

(54) MAGNETIC ACTUATOR AND MECHATRONIC SYSTEM

(71) Applicant: CEDRAT TECHNOLOGIES, Meylan (FR)

(72) Inventors: Frank Claeyssen, Meylan (FR); Gérald Aigouy, La Rochette (FR); Kevin Benoit, Le Touvet (FR)

(73) Assignee: DECRAT TECHNOLOGIES, Meylan (FR)

( * ) Notice: Subject to any disclaimer, the term of this patent is extended or adjusted under 35 U.S.C. 154(b) by 18 days.

(21) Appl. No.: 17/011,091

(22) Filed: Sep. 3, 2020

(65) Prior Publication Data

US 2021/0065948 A1 Mar. 4, 2021

(30) Foreign Application Priority Data

Sep. 3, 2019 (FR) ..................................... 19/09648

(51) Int. Cl.
| | |
|---|---|
| *H01F 7/08* | (2006.01) |
| *H01F 7/02* | (2006.01) |
| *H01F 7/06* | (2006.01) |
| *H01F 7/16* | (2006.01) |

(52) U.S. Cl.
CPC ............... *H01F 7/081* (2013.01); *H01F 7/02* (2013.01); *H01F 7/064* (2013.01); *H01F 7/16* (2013.01)

(58) Field of Classification Search
CPC . H01F 7/02; H01F 7/064; H01F 7/081; H01F 7/16
See application file for complete search history.

(56) References Cited

U.S. PATENT DOCUMENTS

| | | | |
|---|---|---|---|
| 3,624,574 A | 11/1971 | Montagu | |
| 4,371,782 A | 2/1983 | Brouwer | |
| 10,707,734 B2* | 7/2020 | Holenstein | .......... A61M 60/205 |
| 2014/0062239 A1* | 3/2014 | Schoeb | ............... F16C 32/0497 |
| | | | 310/90.5 |
| 2016/0077331 A1 | 3/2016 | Walter et al. | |

(Continued)

FOREIGN PATENT DOCUMENTS

FR 2 929 753 A1 10/2009

OTHER PUBLICATIONS

Yongjun Long et al., "Modeling and Analysis of a Novel Two-Axis Rotary Electromagnetic Actuator for Fast Steering Mirror" Journal of Magnetics, vol. 19, pp. 130-139, 2014.

(Continued)

*Primary Examiner* — Bernard Rojas
(74) *Attorney, Agent, or Firm* — Oliff PLC

(57) ABSTRACT

The actuator comprises a movable armature swivelling with respect to a stator provided with flanges on which magnets are fitted and a coil fitted around one of the flanges. The magnets have an axial magnetisation in a z axis and are aligned in an x axis. The movable armature is arranged between the magnets in the x axis. The movable armature is mounted on a guide imposing swivelling around a y axis perpendicular to the x and z axes. The movable armature is separated from the magnets by air-gaps. Each magnet forms a static magnetic circuit with one end of the movable armature and one of the flanges. The coil forms a dynamic magnetic circuit with the ends of the movable armature and the flanges.

21 Claims, 6 Drawing Sheets

(56) References Cited

U.S. PATENT DOCUMENTS

2017/0040868 A1\* 2/2017 Noh ................ F04D 13/064
2019/0199186 A1\* 6/2019 Noh ................ H02K 1/246

OTHER PUBLICATIONS

Yongjun Long et al., "Design of a Moving-magnet Electromagnetic Actuator for Fast Steering Mirror through Finite Element Simulation Method" Journal of Magnetics, vol. 19, pp. 300-308, 2014.

\* cited by examiner though its electric consumption to obtain movement of the movable

MAGNETIC ACTUATOR AND MECHATRONIC SYSTEM

BACKGROUND OF THE INVENTION

The invention relates to a magnetic actuator.

PRIOR ART

In optic devices, magnetic aiming mechanisms use magnetic actuators to move a moving part in translation. The moving part is connected to an interface part of the optic system, in particular the mirror. Optic magnetic aiming mechanisms using four independent magnetic actuators are known. The magnetic actuators generate translations of the moving part. The magnetic actuators can be coupled together, for example of push-pull type to generate a rotation of the moving part. The moving part is connected to the fixed part by a flexible guide. The magnetic actuators used in these mechanisms belong to two major families: moving-magnet actuators and moving-iron actuators.

Research work presentations disclose mechanisms not having four independent actuators but a single stator assembly and moving assembly. Such a teaching is to be found in the publication by Yongjun Long et al. "Modeling and Analysis of a Novel Two-Axis Rotary Electromagnetic Actuator for Fast Steering Mirror" Journal of Magnetics 19(2), 130-139 (2014) and also in the publication by Yongjun Long et al. "Design of a Moving-magnet Electromagnetic Actuator for Fast Steering Mirror through Finite Element Simulation Method" Journal of Magnetics 19(3), 300-308 (2014).

It is however apparent that these mechanisms provide limited movements with air-gaps placed between the moving assembly and two parts of the fixed magnetic circuit. In addition, the magnetic forces are obtained by normal reluctance variation by increasing or reducing the thickness of the air-gaps. For this reason, the magnetic forces undergone by the moving assembly may lead to "sticking" or impacts of the moving assembly on the fixed part, which is detrimental to guiding and to the system as a whole.

To reduce this risk, in the publication "Modeling and Analysis of a Novel Two-Axis Rotary Electromagnetic Actuator for Fast Steering Mirror", the moving part has to be fitted on a flexurally-mounted rod to guide the movements of the movable part. The flexural stiffness of the rod has to be sufficiently high to prevent sticking which is extremely detrimental for the electric consumption. Such a configuration requires the provision of magnets having shapes that are not immediately compatible with their magnetisation requirements, in particular the polarisation direction, thereby implying high production costs. Such a configuration is not easy to achieve or to use.

The publication "Design of a Moving-magnet Electromagnetic Actuator for Fast Steering Mirror through Finite Element Simulation Method" alternatively proposes to install permanent magnets on the movable disk designed to support the mirror. Such a configuration increases the weight of the movable disk. Furthermore the dynamic flux of the coil flows through the permanent magnets which increases the electric consumption. Finally, this mechanism uses magnetic forces by normal reluctance variation, which may lead to sticking or impacts of the moving part on the stator. This configuration also uses a flexurally-mounted rod for guiding, which also penalises consumption.

It emerges from the prior-art configurations that risks of sticking between the moving part and the actuating means are likely to occur which imposes relatively rigid guide mechanisms and therefore high electric consumptions.

OBJECT OF THE INVENTION

One object of the invention consists in providing a magnetic actuator that is easier to produce and whose electric consumption to obtain movement of the movable armature is reduced. The actuator is advantageously designed to form part of an aiming device, preferentially an optic aiming device. For this purpose, the magnetic actuator comprises a stator and a movable armature mounted pivotally with respect to the stator.

The stator is provided with:
  a stator core made from magnetic material and comprising first and second flanges connected by a support,
  a first magnet fitted on one end of the first flange,
  a second magnet fitted on one end of the second flange, the first and second magnets having an axial magnetisation with a movable armature oriented in a first axis, the first and second magnets being aligned in a second axis perpendicular to the first axis,
  at least a first coil fitted around the first flange between the support and the first magnet.

The movable armature is arranged between the first and second magnets in the second axis and has dimensions in the second axis and in a third axis that are each larger than the dimension of the movable armature in the first axis, the third axis being perpendicular to the first and second axis. The movable armature defines a first air-gap with the end of the first flange and with the first magnet and a second air-gap with the end of the second flange and with the second magnet, and has opposite first and second ends in the second axis.

A guide connects the movable armature mechanically with the stator, the guide being configured to allow swivelling of the movable armature around a first axis of rotation parallel to the third axis and to prevent movement of the movable armature in the second axis towards the first magnet or the second magnet.

The first magnet is magnetically coupled with the first end of the movable armature and the first flange to form a first static magnetic circuit. The second magnet is magnetically coupled with the second end of the movable armature and the second flange to form a second static magnetic circuit. The first coil is magnetically coupled with the first and second ends of the movable armature, with the first and second flanges and with the support to form a first dynamic magnetic circuit.

Preferentially, the first flange and second flange extend mainly in the first axis up from the support and the first and second magnets are arranged in the extension of the first and second flanges in the first axis.

According to one development of the invention, the ratio between the thickness of the first and second magnets and the thickness of the movable armature is comprised between 0.8 and 1.2, the thickness being measured in the first axis.

In advantageous manner, a mid-plane of the first and second magnets in the first axis is a mid-plane of the movable armature.

In one development, first and second poles made from magnetic material are respectively placed on the first and second magnets, the first and second poles being separated from the first and second flanges by the first and second magnets.

Advantageously, the minimum distance between the first magnet and the movable armature is greater than or equal to the minimum distance between the first flange and the movable armature.

In a preferential configuration, a second coil is fitted around the second flange between the support and the second magnet, the second coil forming part of the first dynamic magnetic circuit.

In another development, the guide is fixed to the stator via at least a first attachment point and is fixed to the movable armature by a plurality of second attachment points. The guide comprises a body defining through slots in the first axis, the through slots being in the form of spirals directed towards the at least a first attachment point. The through slots separate the at least a first attachment point and the plurality of second attachment points in the second axis and/or the third axis.

Preferentially, the magnetic actuator comprises third and fourth magnets respectively mounted on third and fourth flanges of the stator core, the third and fourth magnets having an axial magnetisation with a movable armature parallel to the first axis and being aligned in the third axis. The movable armature has opposite third and fourth ends in the third axis separated from the ends of the third and fourth flanges and from the third and fourth magnets by a third and fourth air-gap. The movable armature is arranged between the third and fourth magnets in the third axis.

The third magnet forms a third static magnetic circuit with a third end of the movable armature and the third flange. The fourth magnet forms a fourth static magnetic circuit with a fourth end of the movable armature and the fourth flange. An additional coil forms an additional dynamic magnetic circuit with the third and fourth ends, the third and fourth flanges and the support.

In a particular configuration, the magnetisation of the first and second magnets is in a first magnetisation direction and the magnetisation of the third and fourth magnets is in a second magnetisation direction opposite to the first magnetisation direction. Alternatively, the first, second, third and fourth magnets have the same magnetisation direction.

In a particular embodiment, the movable armature has at least one target collaborating with at least one Eddy current sensor probe to detect movement of the movable armature around the first axis of rotation, the at least one target and the at least one Eddy current sensor probe being separated from the at least a first coil and from the support by the movable armature.

In advantageous manner, the movable armature has two pairs of targets mounted fixed on the movable armature and aligned respectively in the first axis and in the second axis. The stator comprises two pairs of Eddy current sensor probes to detect rotation of the movable armature around the first axis of rotation and the second axis of rotation by differential mode. The two pairs of Eddy current sensor probes are formed by meanders made from conducting material on an annular electronic printed circuit board.

In another development, a load is fixed on a first main surface of the movable armature, the load being separated from the first coil and from the second, third and fourth coils if applicable by the movable armature.

Preferentially, the load is mechanically connected to the movable armature by means of a load support, the load being fixed to the load support via first attachment points, the load support being mechanically connected to the stator via second attachment points. The load support is formed by a plate defining four first through slots in the first axis, the first slots extending from the periphery of the load support to the centre of the load support following a first curved path with a first concaveness to define four areas, and defining at least third slots extending in an arc of a circle around the centre starting from the first slots.

The load support comprises four second through slots in the first axis. The second slots extend from the periphery of the load support to the first slots following a second curved path with the first concaveness. Each area comprises a second slot to define two elementary areas in each area, the first and second attachment points being arranged alternately. A first attachment point or a second attachment point separates a first slot and a consecutive second slot, the third slots extending between the centre and the second slots.

In an advantageous configuration, the guide is fixed to the first main surface of the movable armature and the load support is fixed to the second main surface of the movable armature.

In another preferential configuration, the guide is fixed to the load support by bolts passing through pass-through holes of the movable armature. Advantageously, the at least one target is fitted on one of the bolts.

It is also advantageous to provide for the load to be a reflecting element and preferentially for the reflecting surface to be placed in the same plane as the targets and/or for the reflecting element to be fitted inside the annular electronic circuit.

It is a further object of the invention to provide a mechatronic system enabling improved actuation of the moving part and ensuring more efficient damping of the moving part when no power is applied to the latter.

It is advantageous to provide a mechatronic system provided with a magnetic actuator according to one of the foregoing configurations and that comprises a control circuit defining a first power supply circuit of at least the first coil or an electric damping circuit connected at least to the terminals of the first coil. The electric damping circuit includes a resistor and a capacitor to form an RLC circuit.

BRIEF DESCRIPTION OF THE DRAWINGS

Other advantages and features will become more clearly apparent from the following description of particular embodiments and implementation modes of the invention given for non-restrictive example purposes only and represented in the appended drawings, in which.

DESCRIPTION OF THE EMBODIMENTS

Figure 1:
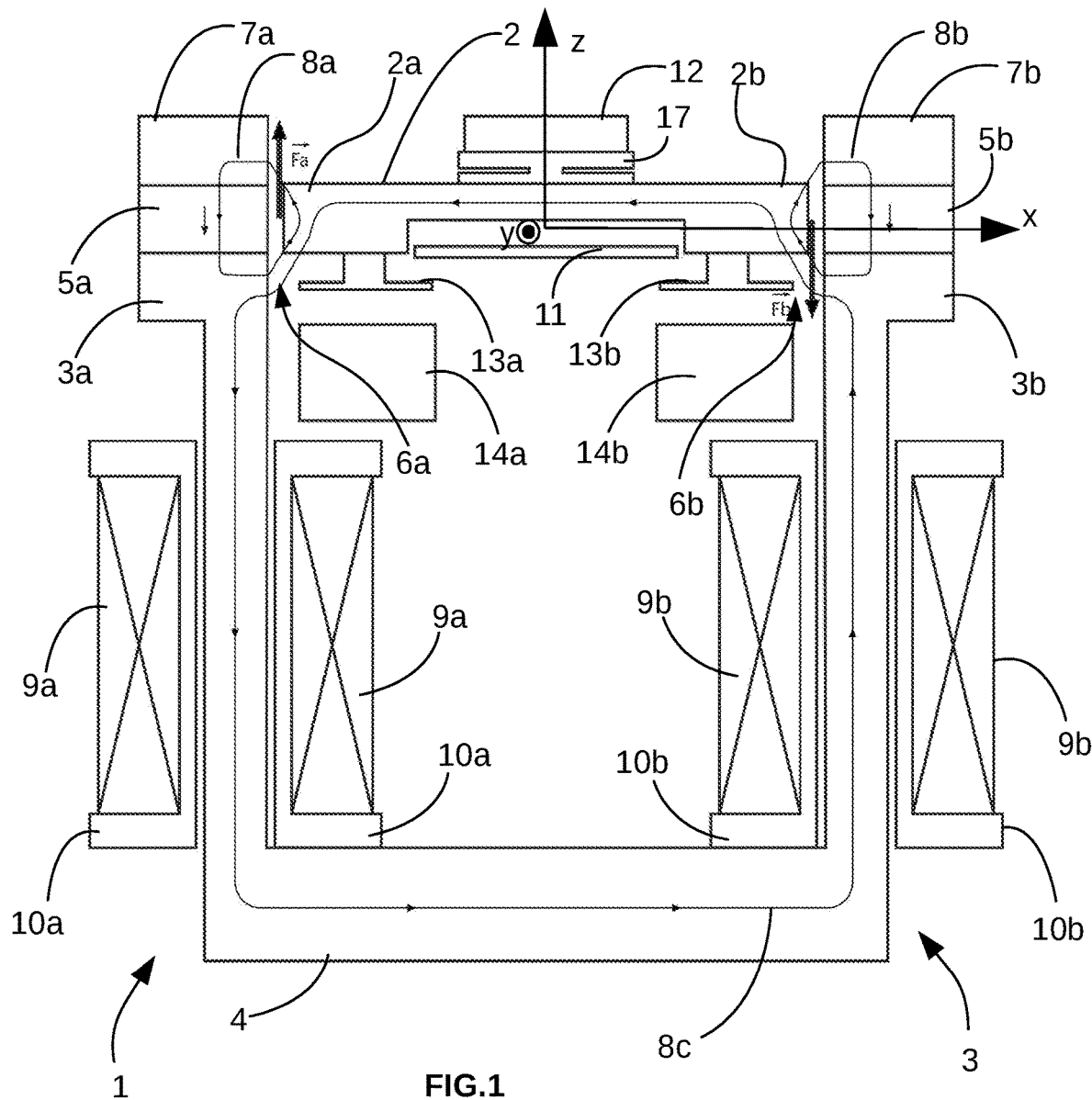
FIG. 1 schematically illustrates a magnetic actuator with a stator core associated with permanent magnets and actuating coils, in cross-section.
Figure 2:
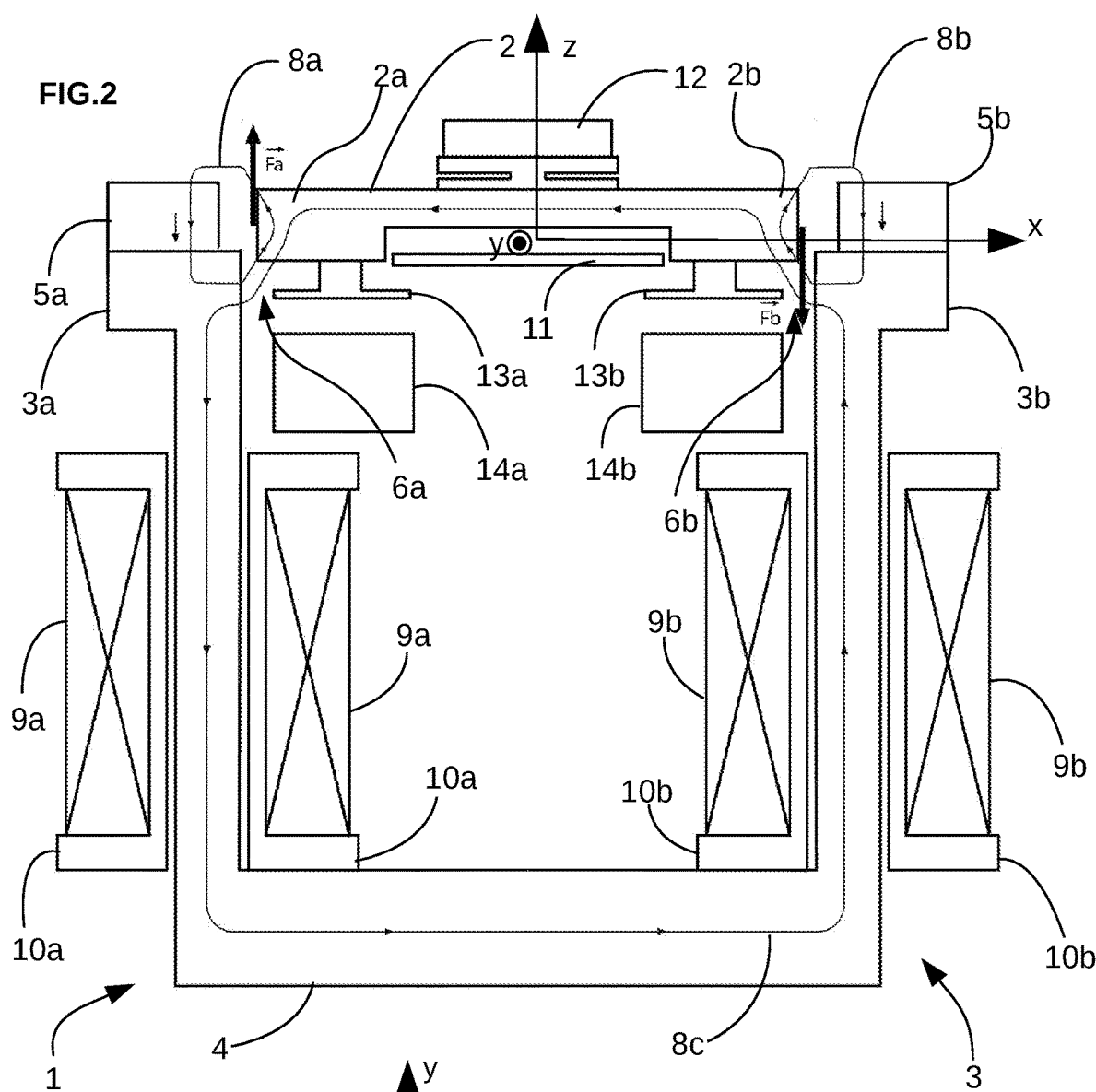
FIG. 2 schematically illustrates another embodiment of a magnetic actuator with a stator core associated with permanent magnets and actuating coils, in cross-section.
Figure 5:
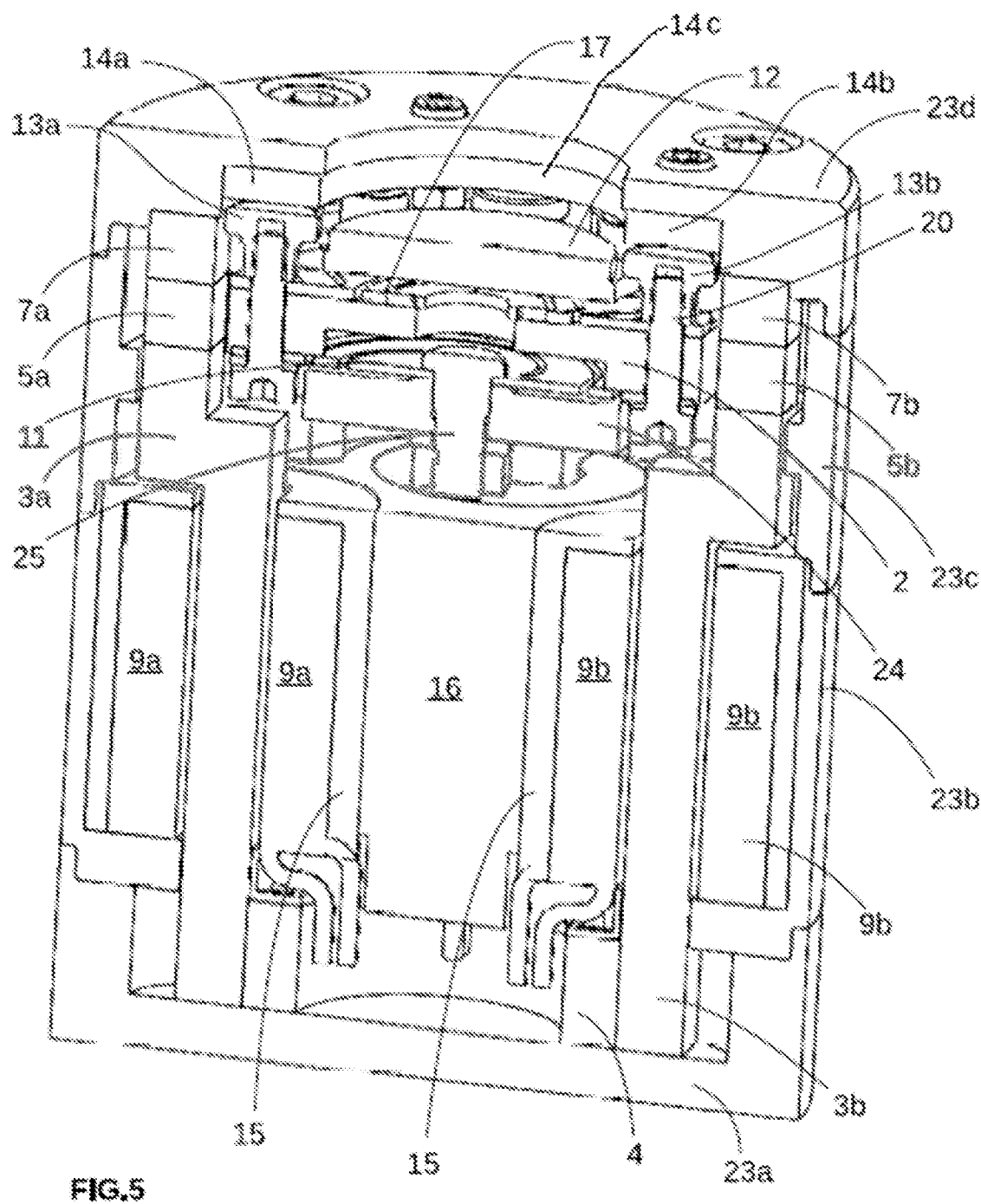
FIG. 5 schematically represents an alternative embodiment of a magnetic actuator with a stator core associated with permanent magnets and actuating coils, in cross-section.

With reference to FIGS. 1, 2 and 5, the magnetic actuator comprises a stator 1 collaborating with a movable armature 2. Stator 1 is considered as being a fixed part and movable armature 2 is fitted movable in rotation with respect to stator 1. Stator 1 comprises a stator core 3 made from magnetic material, preferably from a soft magnetic material for example a ferromagnetic material. Stator core 3 can be made from FeSi, FeCo or from materials called "soft magnetic composites" which are for example ferromagnetic material powders surrounded by an electrically insulating film. Stator core 3 is advantageously devoid of any permanent magnets.

Stator 1 is configured to make movable armature 2 swivel around one or two axes of rotation perpendicular to one another. The movement sought for is a roll and/or pitch movement and not a yaw movement. In preferential manner, movable armature 2 swivels through an angular range of less than 20°.

As illustrated in figures, 1, 2, 4 and 5, stator core 3 comprises a support 4 from which several flanges extend, including in particular a first flange 3a and a second flange 3b. The magnetic actuator has a first magnet 5a and a second magnet 5b that collaborate with movable armature 2. Magnet 5a/5b is a permanent magnet preferentially chosen with respect to a coil as it enables a fixed magnetic field to be applied in passive manner to define a rest position when no power is applied. First magnet 5a and second magnet 5b are magnetically coupled to flanges 3a/3b and to movable armature 2.

First magnet 5a is located on top of first flange 3a and second magnet 5b is located on top of second flange 3b. First and second magnets 5a, 5b are magnets with axial magnetisation and not radial magnetisation. The direction of magnetisation of the two magnets 5a/5b is parallel to a first axis z. In other words, the "North-South" direction of magnets 5a and 5b is parallel to the z axis. The directions of magnetisation of the first and second magnets are identical, i.e. the "North-South" directions of the two magnets are parallel and oriented in the same direction. The flanges are preferentially terminated by a permanent magnet. In advantageous manner, the two magnets 5a/5b are fixed directly to the ends of the two flanges 3a/3b. The flanges channel the magnetic field lines originating from the magnets before the field lines escape to ends 2a/2b of movable armature 2. Magnets 5a/5b are separated from support 4 by flanges 3a/3b.

First magnet 5a and second magnet 5b are aligned in a second x axis that is perpendicular to the first z axis. Movable armature 2 is arranged between first magnet 5a and second magnet 5b. Movable armature 2, first magnet 5a and second magnet 5b are aligned in the second x axis. Movable armature 2 has a first end 2a and a second end 2b that are opposite one another in the second x axis. In preferential manner, the centre of first magnet 5a, the centre of second magnet 5b and the centre of movable armature 2 are aligned in the x axis. The centre is measured in the z axis.

Figure 3:
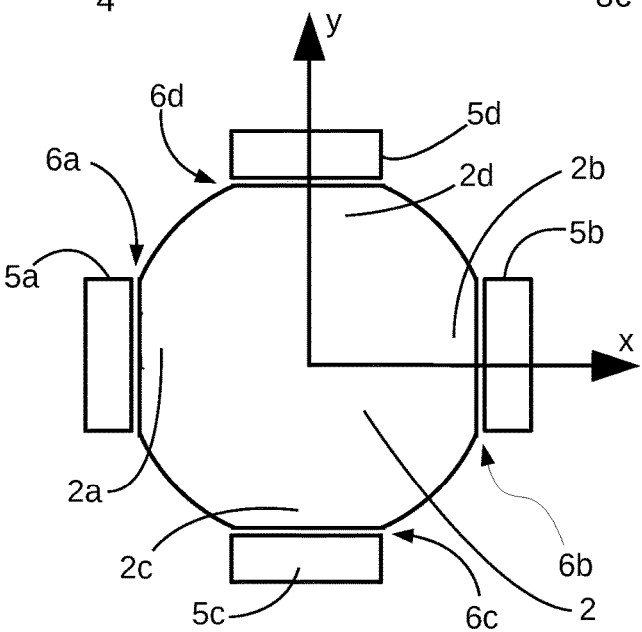
FIG. 3 schematically represents a particular configuration of a movable armature arranged between the permanent magnets, in top view.

As illustrated in FIGS. 1, 2 and 3, movable armature 2 is separated from first magnet 5a and from the end of flange 3a by a first air-gap 6a. Movable armature 2 is separated from second magnet 5b by a second air-gap 6b. First end 2a is substantially facing first magnet 5a and second end 2b is substantially facing second magnet 5b. The two ends 2a/2b are connected by a magnetic material to form a magnetic circuit channelling the field lines between the two ends.

Depending on the configurations, movable armature 2 is in the form of a solid part or preferentially an apertured part. Movable armature 2 is of planar configuration and can be in the form of a disc or of a disc presenting a plurality of flat spots. Advantageously, ends 2a/2b of the movable armature are formed by flat spots facing a magnet 5a/5b. The magnet has a flat surface facing the end so as to define a substantially constant air-gap between movable armature 2 and magnet 5a/5b. Air-gaps 6a/6b are of sufficient thickness for an angular movement of movable armature 2 not to cause a collision between movable armature 2 and stator 1.

In general manner, the magnetisation lines and directions applied by first and second magnets 5a and 5b are chosen to apply static fields Hsa and Hsb the components of which in the x axis are of opposite direction in the areas of air-gaps 6a and 6b.

First magnet 5a forms a first static magnetic circuit 8a with first end 2a of movable armature 2 and first flange 3a. Second magnet 5b forms a second static magnetic circuit 8b with second end 2b of movable armature 2 and second flange 3b. In the embodiment illustrated in FIG. 1, the two magnets 5a and 5b are arranged to have a South-North magnetisation directed towards flanges 5a/5b.

It is advantageous to have magnets of rectangular shape to facilitate manufacturing of the actuator, to reduce the cost of the latter and achieve a better control of the magnetic forces applied. The magnets can be made from SmCo or from NdFeB.

The two magnets 5a and 5b are advantageously capped by a soft magnetic material forming a magnetic pole 7a/7b and advantageously chosen from FeSi, FeCo and the materials called "soft magnetic composites". Stator 1 has a first pole 7a capping first magnet 5a and a second pole 7b capping second magnet 5b. First magnetic pole 7a is separated from first flange 3a by first magnet 5a and second magnetic pole 7b is separated from second flange 3b by second magnet 5b in the z axis. Preferentially, each pole 7a/7b is in direct contact with a magnet 5a/5b. The use of a magnetic pole improves channelling of the magnetic field lines in first and second static circuits 8a and 8b and enhances magnetic coupling with movable armature 2. It is particularly advantageous to have identical structures for first flange 3a and second flange 3b with their associated magnet 5a/5b and possibly their magnetic pole 7a/7b.

As indicated in the above, magnet 5a creates a first static magnetic flux flowing through a first static magnetic circuit 8a. First static magnetic circuit 8a starts from first magnet 5a and then passes through first flange 3a, air-gap area 6a, end 2a of movable armature 2, again an air-gap area, and magnetic pole 7a.

This flux produces a static magnetic field Hsa in air-gap area 6a, performing magnetic polarisation of the latter. Magnet 5b creates a second static magnetic flux flowing through a second static magnetic circuit 8b, similar to circuit 8a. Second static magnetic circuit 8b starts from second magnet 5b and then passes through second flange 3b, air-gap area 6b, end 2b of movable armature 2, again an air-gap area, and magnetic pole 7b. This flux creates a static magnetic field Hsb in air-gap area 6b, performing magnetic polarisation of the latter. The magnetic field lines of magnetic circuits 8a and 8b have a component in the x and z axis in air-gaps 6a and 6b. The magnetic field lines have a component in the x and z axis in first and second ends 2a and 2b.

In the embodiment illustrated in FIG. 2, magnetic poles 7a and 7b are absent. It is also possible to provide for the magnets to be located away from ends 2a/2b in comparison with the ends of flanges 3a/3b supporting magnets 5a/5b in the x axis. The offset of magnets 5a/5b with respect to the flanges can be applied in the configuration of FIG. 1.

The two magnetic fluxes originating from magnets 5a and 5b apply two magnetic attraction forces on the two opposite ends of movable armature 2. The angular position of movable armature 2 is adjusted so as to reduce the reluctance defining the rest position of movable armature 2 which is established along the x-axis. In preferential manner, the two magnets 5a/5b are identical and are arranged so that the intensities (in absolute value) of the generated fields |Hsa| and |Hsb| are equal.

Stator 1 also comprises at least a first coil 9a, preferably first and second coils 9a and 9b, applying a dynamic magnetic field Hd that interacts with the two opposite ends 2a and 2b of movable armature 2. A dynamic magnetic circuit 8c exists between first flange 3a, support 4, second flange 3b, air-gap 6b, movable armature 2 and air-gap 6a, as illustrated in FIG. 1. In general manner, unlike fields Hsa and Hsb due to the magnets, the component of dynamic field Hd in the x axis is in the same direction in air-gap areas 6a and 6b.

Support 4 and first and second flanges 3a/3b are made from magnetic material. Support 4 is made from magnetic material in order to channel the field lines of the coil between the flanges. As illustrated in FIG. 1, stator core 3 is U-shaped when observed in a transverse cutting plane. In advantageous manner, support 4 is monolithic or in a single piece with the two flanges 3a/3b. Support 4 can be solid or apertured. Stator core 3 channels the dynamic magnetic field lines.

In advantageous manner, a continuous magnetic circuit is formed by flanges 3a/3b and support 4 to increase the intensity of the magnetic field in air-gaps 6a and 6b near the two opposite ends 2a and 2b of movable armature 2. The magnetic field lines of magnetic circuit 8c have a component in the x and z axes in air-gaps 6a and 6b. The magnetic field lines have a component in the x and z axes in first and second ends 2a and 2b. As illustrated in FIG. 1 in the cross-sectional view along the plane containing the x and z axes, it is advantageous to provide for the coils, magnets and flanges to belong to one and the same plane perpendicular to the axis of rotation.

First coil 9a is arranged around first flange 3a, between support 4 and magnet 5a. When first actuating coil 9a is powered-on, it generates a magnetic field. In advantageous manner, a second coil 9b is arranged around second flange 3b to make it easier to obtain a strong magnetic field in air-gaps 6a and 6b. This second coil 9b can form a redundancy with first coil 9a to be able to take over from the latter in case of malfunctioning.

The field lines are channelled in stator core 3 by first flange 3a and then by support 4 and by second flange 3b. The field lines exit from second flange 3b via air-gap 6b to reach second end 2b of movable armature 2 made from magnetic material and pass through movable armature 2. The field lines join first flange 3a as from first end 2a of movable armature 2 via air-gap 6a. The two opposite ends 2a/2b of movable armature 2 located facing air-gap 6a, 6b are subjected to the magnetic field produced by magnets 5a/5b and the magnetic field produced by first coil 9a.

Application of a current in coil 9a gives rise to a dissymmetry of the total fields between air-gaps 6a and 6b. In the example of FIG. 1, the field Hd due to coil 9a is oriented in the direction of field Hsb due to magnet 5b and oriented in the opposite direction to field Hsa due to magnet 5a. The total field Hta=Hsa-Hd in air-gap 6a is thereby reduced compared with field Hsa without current application, which reduces the force of attraction of end 2a of the movable armature towards the end of flange 3a. On the contrary, the total field Htb=Hsb+Hd in air-gap 6b is increased compared with field Hsb without current application, which increases the force of attraction of end 2b of the movable armature towards the end of flange 3b.

As illustrated in figures, 1, 2, 4, 5 and 6, to obtain a rotational movement of movable armature 2 with respect to stator 1, it is advantageous to use a guide 11 allowing rotation of movable armature 2 around a first axis of rotation that is parallel to a third axis y perpendicular to the first axis z and perpendicular to the second axis x. In preferential manner, guide 11 is configured to prevent a translational movement of movable armature 2 in the x axis to prevent any sticking or contact with one of the two magnets 5a/5b.

It is advantageous to provide for guide 11 to be configured to only allow rotations around axes of rotation that are perpendicular to the z axis. Guide 11 can be configured to prevent any translation perpendicular to the z axis. By only allowing one or more rotations around an axis of rotation perpendicular to the z axis, modification of the magnetic fields at the two opposite ends of movable armature 2 results in a movement tangentially to the surface facing the magnet mainly in the z axis. This movement is accompanied by an increase of the facing air-gap surface between the end of flange 3b and the surface of end 2b of the movable armature situated in front of magnet 5b leading to a reduction of the reluctance of air-gap 6b without requiring the thickness of air-gap 6b to be reduced. This reduction of the reluctance of air-gap 6b is at the origin of force Fb applied on end 2b of the movable armature. In opposite manner, an increase of the reluctance of air-gap 6a is at the origin of force Fa applied on end 2a of the movable armature.

This results in magnetic forces present at first end 2a and at second end 2b of movable armature 2 forming a torque, making movable armature 2 rotate around the axis of rotation parallel to the y axis, perpendicular to the x axis connecting the two ends.

The intensity of the current applied in first coil 9a defines the force of the flux and the direction of the current defines the direction of the flux. As the dynamic magnetic circuit passes via the two ends of the movable armature, the flux applied by first coil 9a will be in the same direction as one of the two static magnetic circuits and of opposite direction to the other static magnetic circuit which causes the rotation. Reversal of the current direction reverses the direction of the forces and therefore the direction of rotation.

Coils 9a/9b are formed by at least one winding of an electrically conducting wire, for example an enamelled copper wire. The flanges made from magnetic material channel the magnetic field lines so that the dynamic magnetic field Hd originating from coils 9a and 9b is added to or subtracted from the static magnetic field Hs originating from magnets 5a and 5b in air-gaps 6a and 6b.

In an advantageous embodiment, first and second coils 9a and 9b are supplied with the same current source to have the same current flowing through the two coils. Preferably, first and second coils 9a and 9b are connected in series so that the current supplying them generates additional fields. In this way, when one and the same current is flowing, coils 9a and 9b apply magnetic fields of opposite directions and of identical intensity in flanges 3a and 3b. In an alternative embodiment, coils 9a and 9b are supplied by different current sources. Each coil can thus ensure a redundancy enabling the actuator to be made to operate even when a supply coil or circuit is malfunctioning.

The current source or sources associated with coils 9a and 9b are configured to provide different current intensities and also two different current directions in the coil or coils to make movable armature 2 swivel in both swivelling directions and continuously in the accessible range.

In an advantageous embodiment illustrated in FIGS. 1, 2, 4 and 5, coils 9a and 9b are formed on coil supports 10a and 10b. Coil supports 10a and 10b are made from non-electrically conducting materials thereby preventing any short-circuiting between coils 9a/9b and stator core 3. Such a configuration makes for ease of installation of coils 9a and 9b.

As indicated in the above, movable armature 2 is located inside stator 1 between the two magnets 5a and 5b. Movable armature 2 comprises a magnetic part forming the two ends 2a/2b.

In advantageous manner, the thickness ratio between movable armature 2 and the magnets is comprised between 0.8 and 1.2. Preferentially, the thickness of movable armature 2 is identical to the thickness of first and second magnets 5a/5b in the z axis. Preferentially, the mid-plane of movable armature 2 at rest is aligned with the mid-plane of magnets 5a/5b even more preferentially when the actuator is provided with magnetic poles 7a/7b. The mid-plane corresponds to the plane located at equal distance from the two opposite surfaces of the magnets or of movable armature 2 in the z axis. In the absence of magnetic poles 7a/7b, it is advantageous to arrange the mid-plane of the movable armature so that it is aligned with the interface between magnet 5a/5b and flange 3a/3b.

Movable armature 2 is of planar shape. Movable armature 2 advantageously has a length in the x axis and a width in the y axis that are larger than its thickness in the z axis, for example at least three times larger. Movable armature 2 extends mainly along the x and y axes. Movable armature 2 advantageously has an axis of symmetry parallel to the z axis. In preferential manner, the axis of symmetry of movable armature 2 is co-linear with an axis of symmetry of stator core 3 or at least of the flanges. Movable armature 2 has opposite first and second main surfaces connected by a side wall. The side wall defines opposite first and second ends 2a, 2b. The first main surfaces are designed to receive a load to be made to swivel with respect to the stator. The load can be a mirror, a sample or any other item that is to be made to pivot.

In the embodiment illustrated in FIGS. 1, 2, 3, 4 and 5, the dimension of movable armature 2 in the x axis is slightly smaller than the smallest of the distances between the separating distance between the two magnets 5a/5b, the separating distance between the two flanges 3a/3b and the separating distance between the two poles 7a/7b, to provide magnetic air-gaps 6a/6b and prevent any contact between movable armature 2 and flanges 3a/3b, magnets 5a/5b and poles 7a/7b when rotation takes place. The width of air-gaps 6a/6b is chosen small compared with the dimension of movable armature 2 in the x axis.

The two main surfaces of movable armature 2 do not present any overlap by a flange or by a magnet in the z axis thereby preventing any risk of contact. These surfaces can be strictly flat, flat with a chamfer, or slightly rounded in a cutting plane containing the x and z axis, for example rounded with a diameter equal to the dimension in the x axis of movable armature 2.

To prevent movable armature 2 from sticking on the magnets, movable armature 2 is mounted on a guide 11 that restricts or prevents movements of movable armature 2 in the plane perpendicular to the z axis. Movable armature 2 is mechanically connected to the stator and for example to stator core 3 by means of guide 11. Guide 11 is advantageously mounted fixed on stator core 3. It is particularly advantageous to use a guide 11 that prevents translations of the movable armature in the x axis and in the y axis and preferentially any translation in a plane containing the first axis and second axis. It is particularly advantageous to choose a guide different from a flexural rod as such a configuration does not exclude sticking on the magnets while at the same time being difficult to actuate to perform rotation. Guide 11 is advantageously configured to prevent rotation around the third axis z. The guide defines one or more axes of rotation that are substantially contained in the volume of guide 11. The guide can be configured to allow rotation of movable armature 2 around axes of rotation perpendicular to the z axis and to prevent translations perpendicular to the z axis thereby making it easier to obtain a constant or quasi-constant air-gap when the rotations take place. In case of vibration, risks of sticking are also prevented.

The two flanges 3a/3b extend mainly or solely in the first axis z perpendicular to the second axis x and to the third axis y starting from support 4.

Guide 11 can be mounted fixed on stator 1, for example being fixed on stator core 3. Guide 11 supports the weight of movable armature 2 while allowing rotational movements of the latter at least around the first axis of rotation. It is advantageous to form the guide by means of a flat or substantially flat plate that is apertured by means of several slots so as to form a flexible guide bearing. The slots, the attachment points to stator 1 and the attachment points to movable armature 2 are arranged to facilitate rotation around the x and y axes and to restrict other movements. The slots are pass-through in the z axis.

By using a guide in the form of a plate with apertures formed by slots, movable armature 2 can swivel without having to overcome friction forces thereby enabling small angular movements to be obtained. Rotation is obtained by deformation of preferential areas of the apertured plate.

Figure 6:
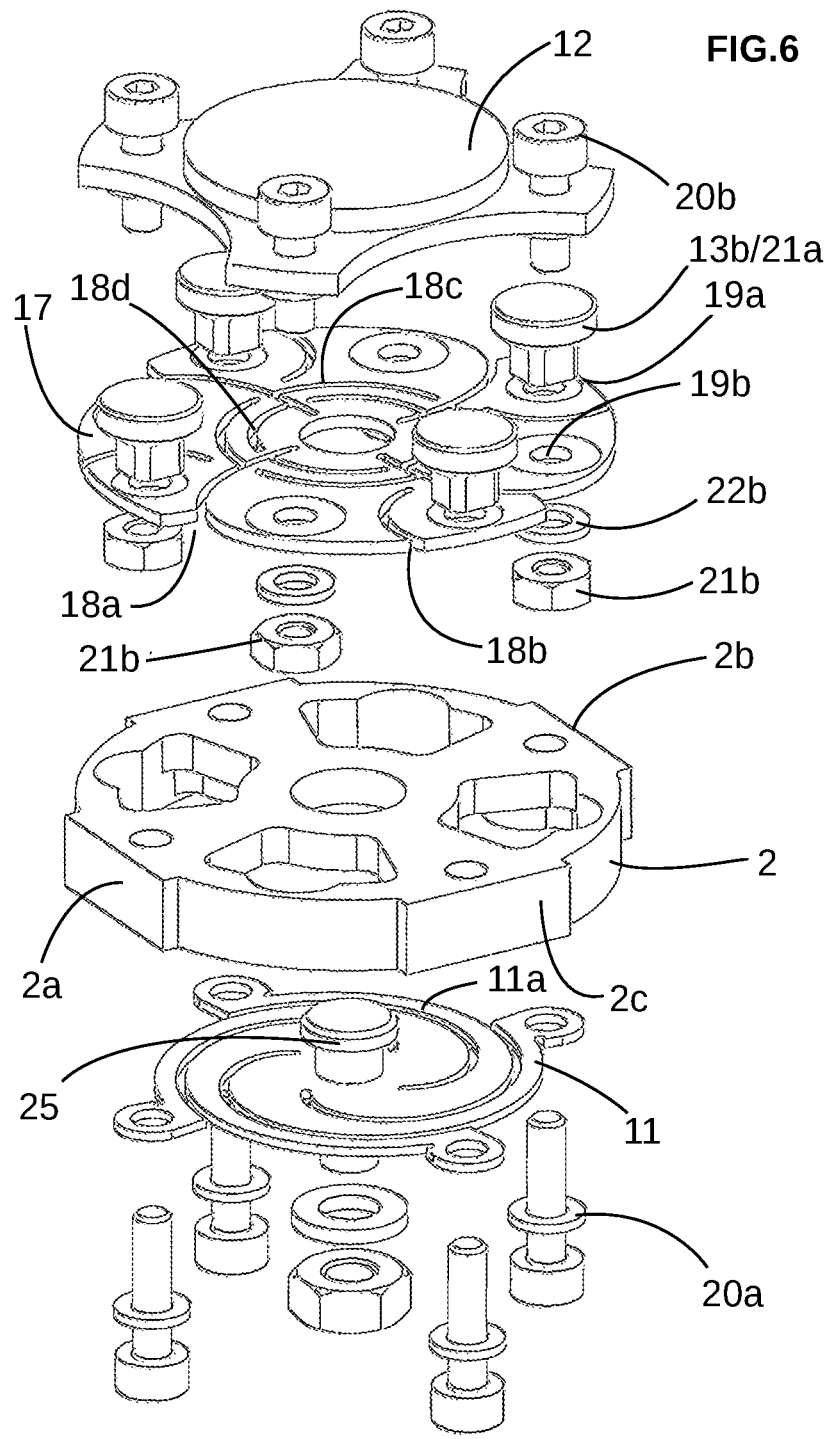
FIG. 6 schematically represents an exploded perspective view of a mirror mounted on a moving part by means of a deformable load support, the movable armature being mounted on a guide.

In the embodiment illustrated in FIGS. 5 and 6, guide 11 is a flexible guide bearing formed by an apertured body for example an apertured plate defining a plurality of slots in the form of spirals or segments of spirals. The plate is fitted perpendicular to the z axis to facilitate rotations around axes perpendicular to the z axis. It is advantageous to form the attachment point between the stator and flexible guide bearing in the centre of the guide bearing. The attachment points between the flexible guide bearing and the movable armature are located at the periphery of the flexible guide bearing. The flexible guide bearing can be made from metallic material. Such a flexible guide bearing makes it easier to perform a rotation around a first axis of rotation parallel to the y axis and around a second axis of rotation parallel to the x axis without introducing any friction thereby making it easier to obtain small angles of rotation ensuring movement with almost unlimited resolution and a good absorption of forces without generating impacts. Guide 11 is planar-shaped and extends mainly in the x and y axis with a thickness that is smaller than its length and width. In advantageous manner, guide 11 is fixed to the bottom main surface of movable armature 2. The guide advantageously forms an axis of rotation that is included in the plane containing the interfaces between the two magnets 5a/5b and the two flanges 3a/3b. In advantageous manner, the guide comprises an axis of symmetry parallel to the z axis.

Figure 7:
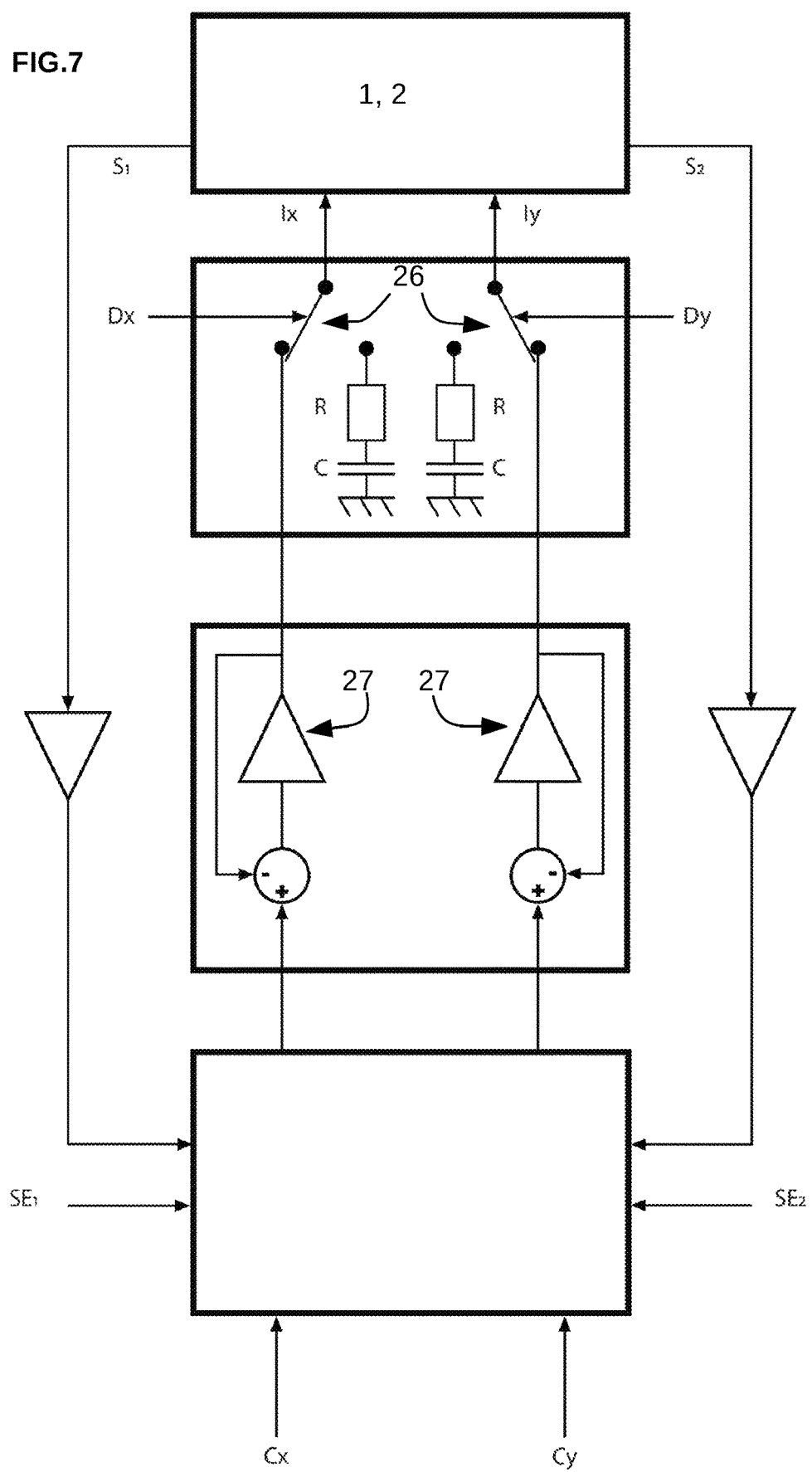
FIG. 7 schematically represents a control circuit connected to the stator.

In advantageous manner, a control circuit is connected to the current source or sources. The control circuit is configured to make an electric current flow in coil or coils 9a and 9b. A dynamic magnetic field Hd is produced that flows along flanges 3a and 3b and support 4 until it reaches the two ends of movable armature 2. A particular embodiment of a control circuit is illustrated in FIG. 7.

By applying a dynamic magnetic field having opposite components along the two flanges 3a and 3b, rotation of movable armature 2 can be obtained. In the configuration illustrated in FIG. 1, field Hd in air-gap 6a is of identical direction to field Hsa in air-gap 6a. Field Hd in air-gap 6b is of opposite direction to field Hsb in air-gap 6b.

The flow direction of the current in coils 9a/9b defines the direction of rotation of the movable armature. Depending on the direction of the applied current, the value of magnetic field Hd is added to or subtracted from the value of static magnetic field Hsa and Hsb. In the first order, the total magnetic torque applied on movable armature 2 and therefore the angle of rotation is proportional to the current intensity I. The direction of the current applied in the coils defines the sign of the angle of rotation of movable armature 2 with respect to stator core 3. The magnetic actuator is able to define the angle of rotation precisely with respect to a reference position. The illustrated configurations enable a magnetic mechanism to be obtained that is controllable in rotation in both directions around the axis of rotation.

The configuration presented is particularly advantageous as it enables torques to be transmitted to movable armature 2 without any mechanical contact thereby avoiding having to overcome friction forces. Movable armature 2 does not have any direct contact with magnets 5a and 5b or with coils 9a and 9b. The movable armature also does not have any contact with flanges 3a/3b. The movable armature is also devoid of magnets resulting in a reduction of the weight to be moved.

In an advantageous embodiment, the minimum distance separating the side wall of movable armature 2 and the lateral surface of magnet 5a/5b (in the x axis) is smaller than the thickness of the magnet and of the movable armature. Advantageously, the minimum distance separating the side wall of movable armature 2 and the end of flange 3a/3b is at least twice smaller, preferably at least five times smaller, than the thickness of the magnet and/or of the movable armature.

The configuration presented is extremely advantageous as it enables a movable parts to be moved around an axis of rotation by means of a single magnetic actuator of moving-iron type. Such a configuration is advantageous as enables the weight of the device to be reduced in comparison with devices that require several actuators to perform a rotation around a single axis.

In the represented configuration, coil or coils 9a/9b form a dynamic magnetic circuit flowing through the stator core and the movable armature. Even when two coils are used, a single magnetic field linked to the dynamic magnetic circuit flows through the movable armature. A difference of power supply between coils 9a and 9b or a different ageing between the coils is more easily mastered than in the prior art configuration where each end is associated with a dynamic magnetic field.

In prior art configurations, the reluctant forces are obtained by variations of air-gap thickness in the z axis, which considerably complicates design of the actuator as the value of the air-gap is considerably modified when rotation takes place and can go as far as to cause sticking of the movable armature, the magnet or the disc on the core. On the contrary, according to the invention, the reluctant forces are obtained by variations of air-gap surface arranged perpendicularly to the x axis, which frees the top and bottom part of the movable armature to allow larger swivel angles, while preventing magnetic sticking and impacts with the stator.

Figure 4:
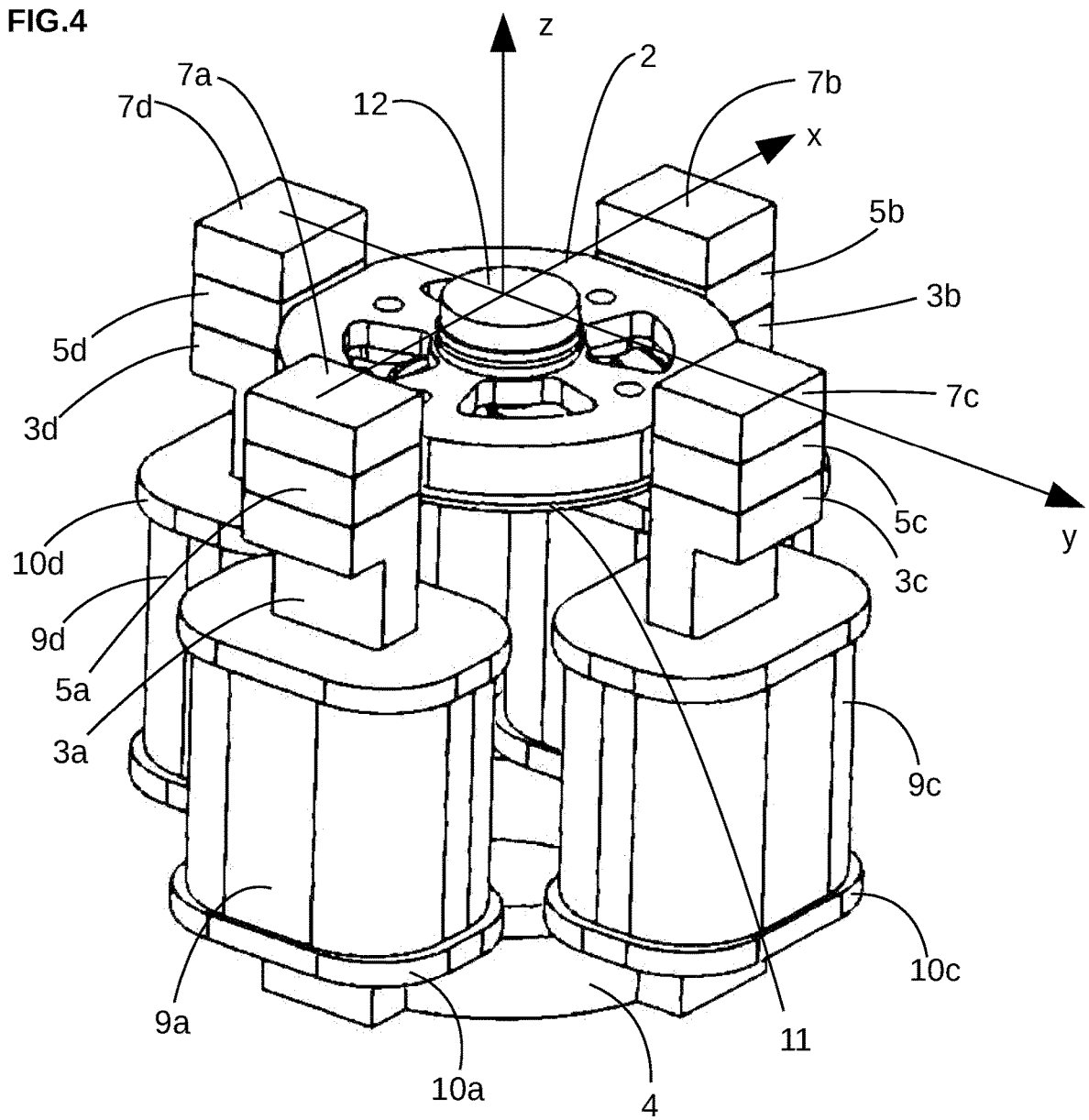
FIG. 4 schematically represents the stator core associated with permanent magnets and actuating coils with a movable armature fitted between the permanent magnets, in perspective view.

With reference to FIGS. 3, 4 and 5, the magnetic actuator can be configured to generate angular movements around two axes of rotation respectively parallel to the x and y axis which are orthogonal to one another and to the z axis. Swivelling of movable armature 2 around the x axis is obtained by an identical configuration to the one described in the foregoing offset by 90° around the z axis. As illustrated in FIG. 2, movable armature 2 comprises third and fourth ends 2c and 2d collaborating with third and fourth magnets 5c and 5d. Third and fourth ends 2c and 2d are connected by a magnetic circuit.

Stator core 3 comprises third and fourth flanges 3c and 3d the first end of which is respectively capped by a third magnet 5c and a fourth magnet 5d which are magnets with axial magnetisation having an orientation parallel to the z axis.

Movable armature 2 is arranged between third and fourth magnets 5c, 5d and aligned with the latter in the y axis. Movable armature 2 is separated from third and fourth magnets 5c, 5d respectively by a third air-gap 6c and a fourth air-gap 6d. Movable armature 2 and the two pairs of magnets advantageously belong to one and the same plane in the absence of a bias on coils 9a, 9b, 9c, 9d. The plane is perpendicular to the z axis.

Third and fourth magnets 5c and 5d respectively form third and fourth static magnetic circuits with third flange 3c and third end 2c of movable armature 2 on the one hand and fourth flange 3d and fourth end 2d of movable armature 2 on the other hand. Opposite third and fourth ends 2c/2d are aligned in the y axis. As for the previous embodiment, it is advantageous to use magnetic poles 7c and 7d on third and fourth magnets 5c/5d.

An additional coil 9c is fitted around third flange 3c. Additional coil 9c generates a second dynamic magnetic field having field lines channelled by third flange 3d, support 4 and fourth flange 3d until the fourth end of movable armature 2 is reached. The field lines originating from fourth end 2d of movable armature 2 pass through the movable armature by means of the magnetic material until they reach third end 2c and then third flange 3c.

Third and fourth magnets 5c/5d define the rest position of the movable armature around the x axis. Additional actuating coil 9c applies a magnetic field causing rotation of movable armature 2 around the x axis in one direction or the other.

As before, it is advantageous to use third and fourth coils 9c and 9b that are respectively installed around third flange 3c and fourth flange 3d so that the dynamic magnetic field lines produced are identical in third and fourth air-gaps 6c/6d in order to modify the intensity of the magnetic coupling existing between movable armature 2, the end of flange 3c, 3d and the two magnets 5c, 5d.

The first set of coils 9a/9b and magnets 5a/5b ensures rotation around the y axis and the second set of coils 9c/9d and magnets 5c/5d ensures rotation around the x axis.

The magnetic operation with two axes of rotation is similar to operation with a single axis of rotation with a distribution of the flux densities and of the field lines with more complex paths. Each pair of magnets with axial polarisation is arranged so that the movable armatures are oriented in the z axis. The magnetisation direction is identical for the two magnets which are facing one another in the x axis or in the y axis, i.e. for the two magnets which cooperate to ensure rotation around one of the axes of rotation. It is advantageous to provide for the pair of magnets performing the rotation around the first access to present an opposite magnetisation direction to that of the pair of magnets performing the rotation around the second axis. In other words, first and second magnets 5a/5b have an opposite magnetisation direction to that of third and fourth magnets 5c/5d. An alternation of the magnetisation direction of the magnets then exists in the z axis when observation takes place around movable armature 2. This configuration enables the dipolar moment of the actuator to be reduced and a weak quadrupole moment to be maintained. However, the use of four magnets having the same magnetisation direction is also possible.

By only activating coils 9a and 9b, it is possible to make movable armature 2 rotate around the y axis. By only activating coils 9c and 9d, it is possible to make movable armature 2 rotate around the x axis. By activating coils 9a, 9b, 9c and 9d, it is possible to combine a rotation around the two axes of rotation.

It is advantageous to provide for coils 9c and 9d to be supplied by one and the same current source and to be connected in series as was explained for coils 9a and 9b. Other embodiments are also possible.

It is advantageous to provide for the four magnets to be identical as far as the intensity of the magnetic field and possibly their dimensions are concerned, as this results in actuation of movable armature 2 being easier to achieve. In the illustrated embodiment, the actuator only comprises two magnets to achieve rotation around an axis of rotation, i.e. four magnets to achieve rotation around two perpendicular axes. Preferentially, the magnets are contained in a plane that also contains the movable armature. The actuating coils belong to another plane offset from the plane of the magnets. The half-space defined by the mid-plane of movable armature 2 and perpendicular to the z axis separates the actuating coils and the load to be moved. The magnetic field lines produced by the magnets and channelled by the flanges depart from the flanges from the lateral surfaces in the direction of the bottom main surface of the movable armature.

The magnetic actuator can form part of an optic aiming device comprising a radiation source and/or a sensor of said radiation.

A mirror 12 or any other reflecting element can be installed on the top surface of movable armature 2. Mirror 12 can be configured to reflect an optic and/or infrared radiation. It is also possible to provide for reflecting element 12 to be configured to reflect another electromagnetic radiation. This configuration is particularly advantageous as the top surface of movable armature 2 is not directly connected to another part located outside movable armature 2 (for example on the core) which would hamper or complicate rotation of movable armature 2. The bottom surface of movable armature 2 is facing the stator core. Mirror 12 is mounted fixed on the top surface of the movable armature so that rotation of movable armature 2 results in an identical rotation of mirror 12.

Mirror 12 can be configured to collaborate with a radiation source for example a laser. The radiation source emits a beam which strikes the mirror and the orientation of mirror 12 enables the reflected beam to be sent back to a sensor. By modifying the orientation of mirror 12, it is possible to send the beam back to several different sensors. The orientation of mirror 12 also makes it possible to adapt to a modification of the position of the sensor with respect to the position of the radiation source. Depending on the embodiments, the radiation source or the sensor can be movable with respect to stator core 3.

The optic aiming device can be used in an optic communication system between two objects, for example between two satellites. Each object has an optic aiming device that is associated with an optic signal emitter and/or receiver. The angular position of mirror 12 can be loop-lock controlled so as to direct the light beam from the first object to the second object and to take account of movements between the objects. The angular position of mirror 12 can be loop-lock controlled in order to direct the received light beam to an optic signal sensor. As the signal source has moved, the orientation of the mirror has to be modified to reflect it on the sensor.

In another embodiment, the reflecting device is replaced by a sample holder or a sample to be analysed. For example, the actuator can form part of a diffractometry device. The movable armature comprises a reference sample. Rotation of the movable armature places the reference sample facing the electromagnetic radiation beam, such as X-rays or particles such as neutrons, to make the beam diffract. The reference sample can be replaced by a sample holder or the movable armature can comprise the reference sample and the sample holder.

In a particular embodiment, an internal sensor system formed by targets 13a/13b and probes 14a/14b is integrated in the actuator. One or more targets 13a and 13b are mounted fixed on movable armature 2. Targets 13a and 13b operate in conjunction with sensors 14a and 14b which are configured to measure the position of movable armature 2 with respect to stator core 3 and therefore to follow the rotation of movable armature 2 with respect to stator core 3. In advantageous manner, sensors 14a/14b are magnetic sensor probes of Eddy current type. In advantageous manner, targets 13a/13b are aligned in the x axis to have a maximum sensitivity to rotation around the y axis. In advantageous manner, targets 13a 13b and probes 14a 14b are separated from stator core 3 and/or from coils 9a/9b by movable armature 2, so as to be on the side where load 12 is situated. In advantageous manner, the surfaces of targets 13a/13b facing probes 14a/14b are situated in the same plane as the reflecting surface of mirror 12 forming the load, which enables the movements of the reflecting surface of mirror 12 to be measured with precision. It is also possible to use magnetic sensors, capacitive sensors and optic sensors to measure the linear travel of an area of movable armature 2 and to deduce the associated angle of rotation therefrom.

Sensor probes 14a/14b are configured to measure the distance separating the target 13a/13b and associated sensor 14a/14b. Sensors 14a/14b are associated with a control circuit configured to calculate the angle of rotation of movable armature 2 following measurement of approaching and distancing between sensors 14a/14b and targets 13a/13b. Advantageously, two targets 13a/13b are arranged on an axis that is perpendicular to the axis of rotation of movable armature 2. These two targets 13a/13b collaborate with two sensors. One sensor detects approaching of a target whereas the other sensor detects distancing of the target which enables the direction of rotation to be determined. The intensity of the signal makes it possible to determine the value of the angle of rotation. Operation with a single sensor is also possible but less advantageous as it is less precise. The use of two sensors for one axis of rotation enables a differential measurement to be made enabling for example compensation of the thermal expansion effects of the movable armature or of the stator due to heating of the actuating coils. The actuator can take advantage of an absence of internal sensors to allow maximum angular travels. Monitoring of these travels is then performed with external sensors.

It is particularly advantageous to manufacture stator core 3 from a heat conducting material, for example a metal. This enables a good transmission of the heat fluxes originating from coils 9a, 9b, 9c and 9d to be achieved. A good heat removal limits the heat transfer to movable armature 2 which comprises a reflecting element 12 the optic properties and/or dimensions of which may change with temperature.

It is advantageous to couple stator core 3 with a heat sink so as to remove a part of the heat produced by coils 9a, 9b, 9c and 9d. The heat sink interfaces are advantageously arranged on support 4. The use of a heat sink enables currents of higher value to be used. As movable armature 2 is not physically coupled with stator core 3, it is difficult for the heat present in stator core 3 to circulate to movable armature 2. In the embodiment illustrated in FIG. 4, the actuating coils are sunk in a resin 15 to promote heat removal. The resin is thermally connected with the heat sink interfaces.

As illustrated in FIG. 6, it is advantageous to install a load support 17 on the top surface of movable armature 2 so as to transmit the rotational movement of movable armature 2 without causing any deformation in mirror 12. Load support 17 is more preferentially configured to make reflecting element 12 insensitive to temperature variations over at least a given temperature range. Load support 17 prevents modifications and deformations of the reflecting element due to a temperature variation caused by the actuator and in particular the coils. Load support 17 is configured to limit the heat flux between movable armature 2 and reflecting element 12.

In the privileged embodiment illustrated in FIGS. 5 and 6, reflecting device 12 is a mirror comprising four fixing lugs. The mirror is fitted on movable armature 2 by means of a load support 17. Load support 17 performs the mechanical connection between load 12 and movable armature 2. Load support 17 is in the form of a plate comprising a plurality of areas that are mechanically connected to one another to form a monobloc or monolithic element but at the same time having areas that can move with respect to one another in almost independent manner in the z axis. Load 12 is fixed to load support 17 via first attachment points, here in the form of bolts 20b. Load support 17 is mechanically connected to movable armature 2 via second attachment points, here in the form of bolts 20a.

Each area has an attachment point of load support 17 with load 12 and with movable armature 2. Each area is separated from the adjacent area by a first through slot 18a in the z axis.

Each area is advantageously broken down into two elementary areas by means of a second slot 18b. One elementary area has the attachment point to load 12 whereas the other elementary area has the attachment point to movable armature 2. To increase the mechanical independence and shifting of the attachment points approaching a translation in the z axis, it is advantageous to provide third and preferentially fourth slots 18c and 18d extending in an arc of a circle. Preferentially, the third and fourth slots substantially define two concentric circles. Third and fourth slots 18c, 18d extend in opposite directions away from slots 18a so that each attachment point is mechanically connected to a securing ring that mechanically connects all the attachment points.

Load support 17 comprises a plurality of through slots or grooves 18a, 18b, 18c and 18d that are arranged to enhance the flexibility of the attachment point or points with movable armature 2 and with reflecting element 12 in the z axis when load support 17 is mounted perpendicularly to the z axis.

Load support 17 is broken down into a plurality of peripheral attachment points separated from one another by first slots 18a that start from the outer end of the load support and progress towards the centre of the load support. The load support enhances the flexibility in the z axis to compensate static indeterminacy faults, for example possible height differences (in the z axis) in the attachment points with the reflecting device. Fixing of load support 17 with movable armature 2 is performed by bolts 20a passing through holes 19a and collaborating with nuts 21a. Bolts 20a advantageously perform fixing of targets 13 which form nuts 21a. The attachment points of the planar mirror support with mirror 12 can be through-holes 19b collaborating with bolts 20b and possibly nuts 21b and preferentially washers 22b.

Load support 17 is formed by a plate having a preferentially substantially circular external shape. Load support 17 advantageously comprises four distinct areas that repeat themselves by means of a rotational symmetry. Two consecutive areas are separated by a first slot 18a extending from the outer circumference in the direction of the centre of load support 17. The centre of the bearing is advantageously a centre of symmetry. First slot 18 is not a straight groove but a curved groove preferentially with a radius of curvature and advantageously with a constant radius of curvature. The different areas are mechanically connected to one another by means of a retaining ring. First slots 18a stop before the retaining ring. Each area comprises an attachment point to load 12 and an attachment point to movable armature 2. The support has two areas aligned in the x axis and two areas aligned in the y axis.

Each area is divided into two elementary areas each comprising a fixing rod and/or a through hole. The two elementary areas are separated by means of a second pass-through groove 18b extending from the outer circumference of the plate to adjacent first slot 18a. The pass-through groove 18b is curved with a curvature oriented in the same direction as first slots 18a and has a larger radius of curvature than the radius of curvature of the first slots 18a. Second pass-through groove 18b and first slots 18a advantageously have the same concaveness orientation. One of the elementary areas is fixed to movable armature 2 whereas the other elementary area is fixed to load 12.

In addition to first slots 18a and pass-through grooves 18b, the plate has third and fourth series of through slots 18c/18d. The two series of slots extend around the centre in the form of an arc of a circle having two different radiuses of curvature. Advantageously, the two series of through slots share the same centre. The third series of through slots 18c comprises one through slot per area and each third through slot 18c extends from first slot 18a to adjacent first slot 18a in a first direction which is the clockwise direction or the anticlockwise direction without reaching adjacent first slot 18a to preserve a mechanical fixing area.

The fourth series of through slots 18d comprises one through slot 18d per area and each fourth through slot 18d extends from first slot 18a to adjacent first slot 18a in a second direction which is opposite to the first direction without reaching adjacent first slot 18a to preserve a mechanical fixing area.

This configuration of load support 17 allows deformation of each area with respect to its adjacent area in the z axis and deformation between the two elementary areas of one and the same area in the z axis. Static indeterminacy faults in particular height differences (in the z axis) between the different elements involved in fixing of reflecting element 12 to the movable armature can be at least partially compensated thereby reducing the mechanical strains induced in reflecting element 12.

In the illustrated configuration, the coils are all arranged between the plane containing movable armature 2 and magnets 5a/5b/5c/5d and support 4 thereby making it possible to limit the space occupation in the upper area of movable armature 2 designed to be functionalised with a reflecting device or other element. Unlike the configuration proposed in the above-mentioned publication "Modeling and Analysis of a Novel Two-Axis Rotary Electromagnetic Actuator for Fast Steering Mirror" by Yongjun Long, the moving part is not arranged in a dish formed by the coils surrounding the mirror. The illustrated configuration enables larger angular travels to be performed.

In the embodiment illustrated in FIG. 5, support 4 is apertured in the centre thereof to allow the wires of actuating coils 9a-9d to exit. Flanges 3a-3d still extend from support 4. The flanges are fixed on support 4 to form a monobloc assembly. Coils 9a, 9b, 9c and 9d are housed in a cylinder 16 and are sunk in resin 15 to facilitate heat removal. Support 4 and flanges 3a-3d are fixed to a first casing element 23a. Coils 9a-9d are installed in fixed manner in cylinder 16 and secured by means of resin 15 with a second casing element 23b fixed to first casing element 23a. Preferentially, cylinder 16 and second casing element 23 form a monolithic part.

A third casing element 23c is fixed on second casing element 23b. Second casing element 23b defines a mounting plate 24 on which guide 11 is fixed by means of a bolt 25 or any other securing means. Movable armature 2 is fixed to the mounting plate 24 by means of guide 11 and a plurality of bolts 20a. Guide 11 is mounted in fixed manner on stator 1 by means of a mounting plate 24 fixed to a casing 23c or forming part of casing 23.

A mirror 12 is mounted on a first surface of movable armature 2 by means of load support 17. Targets 13 are also mounted on the first surface of movable armature 2 around mirror 12, for example at the ends of bolts 20a. Sensor probes 14, advantageously by Eddy current, are fitted on or integrated in an annular printed circuit board (PCB) 14c facing targets 13. The advantage of arranging the four probes in a single PCB is to increase the reproducibility of the probes and make for easier fitting and interconnection of the latter, and also to reduce costs. The probes are advantageously meanders made from conducting material formed on the electronic circuit.

The PCB circuit 14c is fixed to a fourth casing element 23d affixed to second casing element 23b by means of third casing element 23c. Sensors 14 are mounted 20 fixed with respect to the casing and to stator 1. Fourth casing element 23d defines a through hole facing the reflecting element in the z axis to allow the electromagnetic radiation to pass.

The sub-assembly including third casing element 23c, mounting plate 24, bolts 25, guide 11, movable armature 2, load support 17, targets 13, and mirror 12 forms a removable optic head of second casing element 23b and of fourth casing element 23d, which makes it easier to check and install in the actuator, thereby reducing costs.

The magnetic actuator comprises or is associated with a control circuit, for example the one illustrated in FIG. 7. The control circuit has one or more inputs designed to receive setpoints on the rotation to be applied on movable armature 2, for example signals Cx and Cy. The control circuit can have an input designed to receive data relative to rotation around the x axis (Cx) and an input designed to receive data relative to rotation around the y axis (Cy). Depending on the data received, the control circuit applies a first current Ix to a first coil or pair of coils to cause rotation around the x axis and applies a second current Iy to a second coil or pair of coils to cause rotation around the y axis. The intensity of the first current Ix and its direction of flow are defined according to the required rotation.

The intensity of the second current Iy and its direction of flow are defined according to the required rotation. For example, to supply first coil 9a or the two coils 9a/9b, it is possible to use a first current-controlled amplifier 27. The same can be the case to supply third coil 9c or the two coils 9c/9d, with a second current-controlled amplifier 27.

As indicated, it is advantageous to receive first data from sensors 14a/14b in order to evaluate the effective rotation of movable armature 2 around a first axis of rotation and if necessary to adjust the current value to obtain the required tilt angle. Second data from a second pair of sensors can be used to monitor the rotation around the axis of rotation and to adjust the value of the applied current. The control circuit can have third and fourth inputs connected to the first and second pairs of sensors to receive the signals representative of the effective rotations S1 and S2. It is also possible to provide for the control circuit to have additional first and second inputs designed to be connected to an external sensor, for example an optic sensor receiving the flux reflected by the reflecting device. The data from the external sensor is used to adjust the static and/or dynamic angular position of the movable armature. The external sensor enables servo-control of the position of the movable armature 2 to be achieved when the actuator operates in conjunction with an element that is movable with respect to the actuator. The external sensor can emit signals SE1 and SE2 representative of the effective rotations or of the rotation to be performed to keep the light beam in the required position.

The control circuit can be provided with a damping circuit for electrically damping the movements of the actuator when the latter is not powered-on. The damping circuit forms an RLC circuit with the coil or coils.

A first switch 26 is fitted to connect the coil or coils involved in causing rotation around the y axis either to a current source or to the damping circuit. The damping circuit has an electric load advantageously formed by a resistor R preferentially connected in series with an electric capacitor C. The damping circuit is connected via a first terminal to the coil or coils and via a second terminal to a fixed potential, for example ground.

A second switch 26 can be fitted to connect the coil or coils involved in causing rotation around the x axis either to a current source or to the damping circuit. The damping circuit has an electric load advantageously formed by a resistor connected in series with an electric capacitor. The damping circuit is connected via a first terminal to the coil or coils and via a second terminal to a fixed potential, for example ground. The two switches can operate independently by means of signals Dx and Dy applied on their control electrode.

This damping circuit performs damping of the vibrations induced at the resonance of the mechanism. When the mechanism is subjected to external vibrations or impacts as encountered in embedded systems, for example in satellites during launch phases, the mechanical resonance of the mechanism, formed by the moment of inertia and the stiffness in rotation of the movable armature, is excited. This resonance tends to make movable armature 2 including the mirror oscillate, which is not desirable. Due to magnets 5a, 5b, 5c, 5d, the oscillating vibratory movement of movable armature 2 generates the flux variations in the stator circuit which result in voltage variations at the terminals of coils 9a, 9b, 9c, 9d. If the damping electric circuit is connected, these voltage variations generate current variations Ix and Iy enabling the electric power to be electrically dissipated in a resistor R. This electric damping limits the amplitude of the oscillating vibratory movement of movable armature 2.

The invention claimed is:

1. Magnetic actuator comprising a stator and a movable armature mounted swivelling with respect to the stator,
    wherein the stator is provided with:
        a stator core made from magnetic material and comprising first and second flanges connected by a support,
        a first magnet fitted on one end of the first flange,
        a second magnet fitted on one end of the second flange, the first and second magnets having an axial magnetisation with a magnetisation axis directed in a first axis, the first and second magnets being aligned in a second axis perpendicular to the first axis,
        at least a first coil fitted around the first flange between the support and the first magnet,
    wherein the movable armature is arranged between the first and second magnets in the second axis and has dimensions in the second axis and in a third axis that are each larger than a dimension of the movable armature in the first axis, the third axis being perpendicular to the first axis and second axis, the movable armature defining a first air-gap with an end of the first flange and with the first magnet and defining a second air-gap with an end of the second flange and with the second magnet, the movable armature having opposite first and second ends along the second axis,
    wherein a guide mechanically connects the movable armature with the stator, the guide being configured to allow swivelling of the movable armature around a first axis of rotation parallel to the third axis and to prevent movement of the movable armature in translation along the second axis towards the first magnet and the second magnet,
    wherein the first magnet is magnetically coupled with the first end of the movable armature and the first flange to form a first static magnetic circuit,
    wherein the second magnet is magnetically coupled with the second end of the movable armature and the second flange to form a second static magnetic circuit, and
    wherein the first coil is magnetically coupled with the first and second ends of the movable armature, with the first and second flanges and with the support to form a first dynamic magnetic circuit.

2. Magnetic actuator according to claim 1, wherein the first flange and the second flange extend mainly along the first axis away from the support and the first and second magnets are arranged in the extension of the first and second flanges in the first axis.

3. Magnetic actuator according to claim 1, wherein a ratio between a thickness of the first and second magnets and a thickness of the movable armature is comprised between 0.8 and 1.2, the thicknesses being measured along the first axis.

4. Magnetic actuator according to claim 1, wherein a mid-plane of the first and second magnets in the first axis is a mid-plane of the movable armature.

5. Magnetic actuator according to claim 1, wherein first and second poles made from magnetic material are respectively placed on the first and second magnets, the first and second poles being separated from the first and second flanges by the first and second magnets.

6. Magnetic actuator according to claim 1, wherein a minimum distance between the first magnet and the movable armature is greater than or equal to a minimum distance between the first flange and the movable armature.

7. Magnetic actuator according to claim 1, wherein a second coil is fitted around the second flange between the support and the second magnet, the second coil forming part of the first dynamic magnetic circuit.

8. Magnetic actuator according to claim 7, wherein the guide is fixed to the stator via at least a first attachment point and is fixed to the movable armature via a plurality of second attachment points, wherein the guide comprises a body defining through slots in the first axis, the through slots being in the form of spirals directed towards the at least a first attachment point and wherein the through slots separate the at least a first attachment point and the plurality of second attachment points in the second axis and/or the third axis.

9. Magnetic actuator according to claim 1, comprising third and fourth magnets respectively fitted on third and fourth flanges of the stator core, the third and fourth magnets having an axial magnetisation with a magnetisation axis parallel to the first axis and the third and fourth magnets being aligned in the third axis, the movable armature having opposite third and fourth ends in the third axis separated from ends of the third and fourth flanges and from the third and fourth magnets by a third air-gap and fourth air-gap, the movable armature being arranged between the third and fourth magnets in the third axis, wherein
    the third magnet forms a third static magnetic circuit with the third end of the movable armature and the third flange,
    the fourth magnet forms a fourth static magnetic circuit with the fourth end of the movable armature and the fourth flange,
    and wherein an additional coil forms an additional dynamic magnetic circuit with the third and fourth ends, the third and fourth flanges and the support.

10. Magnetic actuator according to claim 9, wherein magnetisation of the first and second magnets is in a first magnetisation direction and wherein magnetisation of the third and fourth magnets is in a second magnetisation direction opposite to the first magnetisation direction or wherein the first, second, third and fourth magnets have a magnetisation in the same magnetisation direction.

11. Magnetic actuator according to claim 1, wherein the movable armature has at least one target collaborating with at least one Eddy current sensor probe to detect movement of the movable armature around the first axis of rotation, the at least one target and the at least one Eddy current sensor probe being separated from the at least a first coil and from the support by the movable armature.

12. Magnetic actuator according to claim 9, wherein the movable armature has two pairs of targets mounted fixed on the movable armature and aligned respectively in the first axis and in the second axis, wherein the stator comprises two pairs of Eddy current sensor probes to detect rotation of the movable armature around the first axis of rotation and the second axis of rotation by differential mode, and wherein the two pairs of Eddy current sensor probes are formed by coils made from conducting material on an annular electronic printed circuit board.

13. Magnetic actuator according to claim 1, wherein a load is fixed on a first main surface of the movable armature, the load being separated from the first coil by the movable armature.

14. Magnetic actuator according to claim 13, characterised in that the load is mechanically connected to the movable armature by means of a load support, the load being fixed to the load support via first attachment points, the load support being mechanically connected to the movable armature via second attachment points,
the load support being formed by a plate defining four first slots passing through the plate along the first axis, the first slots extending from a periphery of the load support in a direction toward a centre of the load support following a first curved path with a first concaveness to define four areas, and defining at least third slots extending in an arc of a circle around the centre starting from the first slots.

15. Magnetic actuator according to claim 14, wherein the load support comprises four second slots passing through the plate along the first axis, the four second slots extending from the periphery of the load support in a direction toward the first slots following a second curved path with a first concaveness, each area comprising a second slot to define two elementary areas in each area, the first and second attachment points being arranged alternately, a first attachment point or a second attachment point separating a first slot and a consecutive second slot, the third slots extending between the centre and the four second slots.

16. Magnetic actuator according to claim 14, wherein the guide is fixed on a first main surface of the movable armature and the load support is fixed on a second main surface of the movable armature.

17. Magnetic actuator according to claim 16, wherein the guide is fixed to the load support by bolts passing through pass-through holes of the movable armature.

18. Magnetic actuator according to claim 11, wherein:
a load is fixed on a first main surface of the movable armature, the load being separated from the first coil and from the second coil by the movable armature,
the load is mechanically connected to the movable armature by means of a load support,
the load is fixed to the load support via first attachment points, the load support being mechanically connected to the movable armature via second attachment points,
the load support is formed by a plate defining four first slots passing through the plate along the first axis, the first slots extending from a periphery of the load support in a direction toward a centre of the load support following a first curved path with a first concaveness to define four areas, and defining at least third slots extending in an arc of a circle around the centre starting from the first slots,
the guide is fixed on a first main surface of the movable armature and the load support is fixed on a second main surface of the movable armature,
the guide is fixed to the load support by bolts passing through pass-through holes of the movable armature, and
the at least one target is fitted on one of the bolts.

19. Magnetic actuator according to claim 13, wherein the load is a reflecting element.

20. Magnetic actuator according to claim 13, wherein the load is a reflecting element, and wherein the reflecting element is fitted inside the annular electronic printed circuit board.

21. Mechatronic system comprising a magnetic actuator according to claim 1, characterised in that it comprises a control circuit defining a first power supply circuit of at least the first coil or an electric damping circuit connected at least to the terminals of the first coil, the electric damping circuit including a resistor and a capacitor to form an RLC circuit.

* * * * *